United States Patent [19]

Telchuk et al.

[11] Patent Number: 5,135,550
[45] Date of Patent: Aug. 4, 1992

[54] RECIRCULATING WATER WASHER MEANS AND METHOD

[75] Inventors: Steve E. Telchuk, Buffalo Grove; Leslie H. Brown, Carol Stream, both of Ill.; Frank L. Dobias, Livonia, Mich.

[73] Assignee: Binks Manufacturing Company, Franklin Park, Ill.

[21] Appl. No.: 690,341

[22] Filed: Apr. 24, 1991

Related U.S. Application Data

[63] Continuation-in-part of Ser. No. 528,110, May 23, 1990, abandoned.

[51] Int. Cl.$^5$ .............................. B01D 47/12
[52] U.S. Cl. .............................. 55/84; 55/89; 55/240; 55/DIG. 46; 118/326; 454/54
[58] Field of Search .......... 55/89, 84, 94, 223, 55/240, 241, 248, 246, DIG. 46; 98/115.2; 118/326

[56] References Cited

U.S. PATENT DOCUMENTS

| | | | |
|---|---|---|---|
| 3,018,847 | 1/1962 | Stanly | 55/241 |
| 3,585,786 | 6/1971 | Hardison | 55/241 X |
| 4,356,009 | 10/1982 | Calvert | 55/241 X |
| 4,399,742 | 8/1983 | Dobias | 55/DIG. 46 X |
| 4,521,227 | 6/1985 | Gerdes et al. | 55/241 X |
| 4,582,515 | 4/1986 | Eneroth et al. | 55/240 X |

*Primary Examiner*—Charles Hart
*Attorney, Agent, or Firm*—Juettner Pyle & Lloyd.

[57] ABSTRACT

A recirculating washer for a paint spray booth is illustrated and described, and uses upward air motion and gravity to recirculate water on and along two or more recirculating baffles facing each other to form one or more curtains of water for cleaning paint laden air from the pain spray booth. The washer's baffles direct the water to form the curtains. The recirculating washer may be used in a booth by itself, or with one or more washers of another type washer, such as a slot type and/or an air nozzle-water nozzle type washer to reduce the amount of water required by the booth. The washer may use the other type washer or a trough for cource of the recirculated water. Preferably, the washer utilizes the floor water from the booth so that the water requirement for the entire booth is very low, say on the order of 40 gallons per minute per foot of booth length, or less, for a booth of a size capable of production line painint of automotive vehicles.

66 Claims, 7 Drawing Sheets

RECIRCULATING WATER WASHER MEANS AND METHOD

This application is a continuation in part of U.S. patent application Ser. No. 07/528,110, filed May 23, 1990, now abandoned in the names of the inventors, Steve E. Telchuk, Leslie H. Brown and Frank L. Dobias, entitled "Recirculating Water Washer Means and Method", and assigned to the same assignee as the present application.

This invention relates to paint spray booth washers, and more particularly, to a recirculating washer which has a reduced water flow requirement.

BACKGROUND OF THE INVENTION

Heretofore, a very effective type washer or cleaning section for a paint spray booth has been developed by Binks Manufacturing Company, utilizing an air nozzle (or venturi) and water nozzle spraying one or more sheets of water across the air nozzle for removing paint particles from paint ladened air passing through the air nozzle. Such washer means are shown in U.S. Pat. Nos. 4,239,512 and 4,399,742 assigned to Binks Manufacturing Company. This style air nozzle-water nozzle washer has been installed in various downdraft booths wherin a plurality of these washer means have been located below the downdraft booth on its centerline, below and at the side of such a booth, and below the slot of a slot type booth.

While such booths are very effective and have met with considerable commercial success, they have required a high water flow through the plurality of water nozzles. For example, in a ten foot length of booth of a size to production line paint automobiles which has two water washed subfloor sides, each side of the subfloor requiring 5 gallons of water per foot of booth length per minute and four air nozzle-water nozzle washers each requiring 150 gallons per minute, the total water flow required is 700 gallons per minute. Now all this water must be treated before it can be reused or discharged so that it represents a considerable expense both in initial installation and operating costs.

As noted above, it has been known to use water type washers in paint spray booths and even washers having some form of water nozzle. For example see U.S. Pat. Nos. 2,337,983 and 3,798,880, both of which show a water nozzle in a long tube having a converging-diverging portion. U.S. Pat. No. 3,112,352 also has a long converging-diverging nozzle which aspirates water therin due to the air flow through the nozzle. Like the previous described Binks devices, the devices shown in the just above mentioned three patents also utilize a considerable quality of water.

SUMMARY OF THE PRESENT INVENTION

The present invention comprises a recirculating washer or eliminator section with a greatly reduced water flow requirement and which recirculates the water to provide one or more curtains of water through which paint ladened air from a spray painting operation is drawn for cleaning the paint ladened air. The present invention can be utilized in a booth by itself, or with a series of similar sections to provide a cleaning section or washer, or can be used to augment other type washers in the booth, such as the prior art slot type and/or air nozzle-water nozzle washers. The present invention comprises a source of water, which can be either a trough supplied by a pipe or another washer, means for moving the paint ladened air through the washer of the present invention (such as a conventional exhaust fan), means for causing the supplied water to move upwardly and downstream with respect to the moving air flow due to the air's motion, means for forming the supplied water into at least one curtain of water generally transverse to the moving air flow for cleaning the air as it passes through the water curtain, and means for recirculating and/or directing the water by gravity back upstream against the air flow to again reform the water curtain. Preferably, the source of water is the booth's own flooded sheet or water washed wall or subfloor (or floor if no grill floor is present in the booth) so that the water requirement for the booth is minimized. Preferably, means for forming and means for recirculating and/or directing are a pair of opposed recirculating baffles having no moving operational parts, the air flow between the upper and lower or first and second recirculating baffles causing the water to move up the underside of one of the pair of baffles (the upper of first recirculating baffle) and gravity causing the water to move down the top side of the other of the pair of baffles (the lower or recirculating return baffle). The curtain of water formed, in fact, is generally two curtains, one off of each of the two baffles (first and return) so that the air is actually cleaned twice, once as it passes through each of the two water curtains formed between the two baffles. To enhance the formation of the water curtains, the edges of the baffles can terminate in sharpened saw tooth profiles which increase the shearing action of the water and its atomization. Of course, to facilitate optimumization, the baffles and the saw tooth profile portions thereof can be made adjustable.

When used and in order to increase the cleaning efficiency of the air nozzle-water nozzle type washer means, the air nozzle thereof can be made of a long length to increase the time the paint laden air and water are in contact or held together before the air expands away from the water as it leaves the downstream exit of the nozzle. Additionally, the nozzle can be given a converging-diverging construction to reduce any pressure loss due to the increased length of the air nozzle.

A primary object of the present invention is to reduce the water consumption of a paint spray booth.

It is another object of the present invention to provide a washer which recirculates water to minimize the quantity required, but yet provide highly efficient cleaning action.

Still another object of the present invention is to provide a recirculating washer which utilizes the water flowing off the booth's flooded or washed wall, floor or subfloor to further minimize the amount of water required.

Yet another object of the present invention is to provide a recirculating washer which can be utilized alone, can be utilized with one or more other similar washers, or can be utilized with a slot and/or an air nozzle-water nozzle or other type washer.

These and other objects of the present invention will become apparent from the accompanying drawings and the following written description:

DESCRIPTION OF THE PREFERRED EMBODIMENTS

Figures 1, 2:
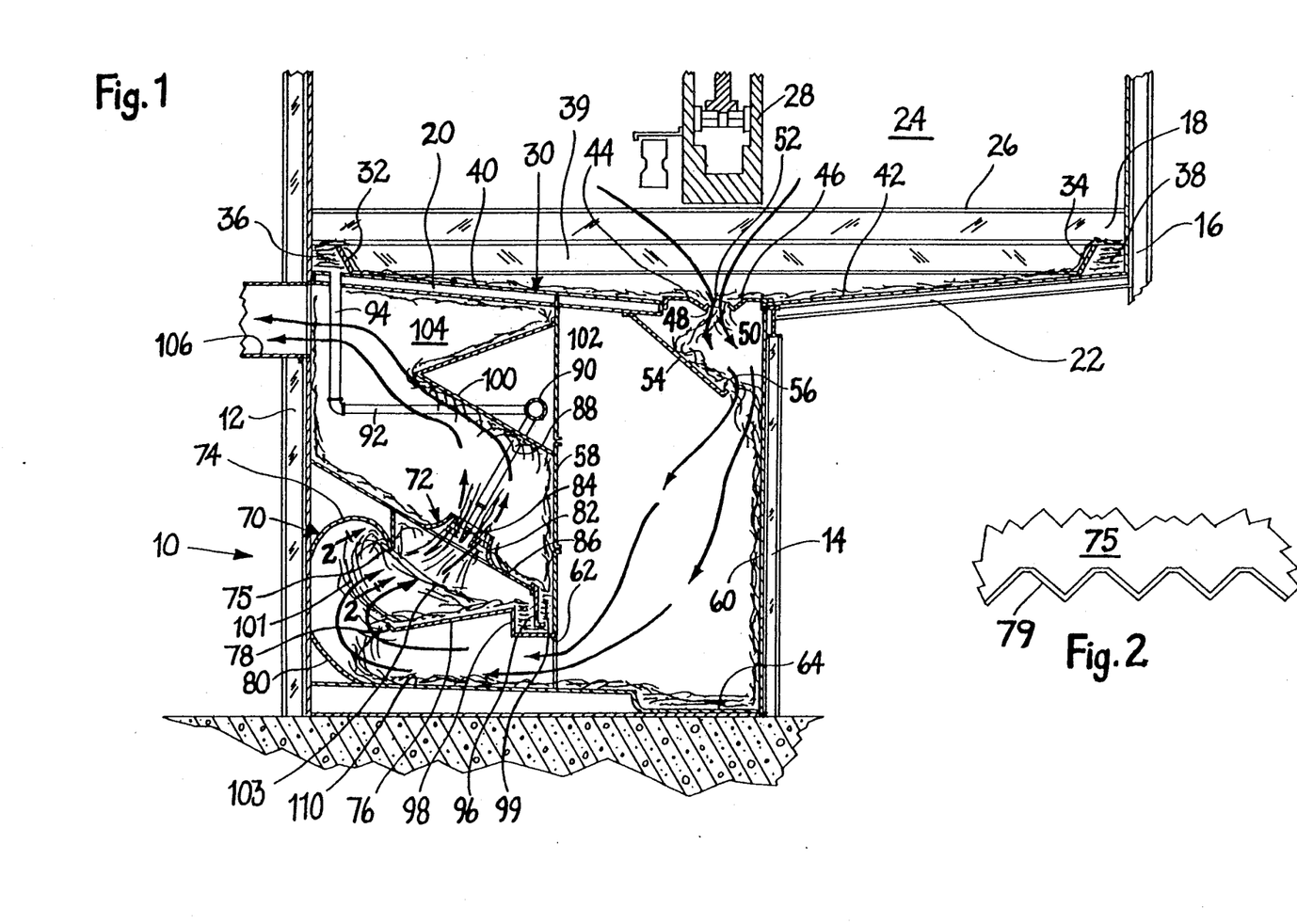
FIG. 1 is a cross-sectional view of a first embodiment of recirculating washer of the present invention utilized in a slot type downdraft booth also having an air nozzle-water nozzle washer.
FIG. 2 is a view taken along the line 2—2 of FIG. 1 showing the sharpened, saw tooth profile of the edge 75 of the baffle 74.

Referring to FIG. 1, a first embodiment 10 or recirculating water washer means of the present invention is shown installed in a paint spray both (only partially shown). The booth is sized to accommodate production line painting of automobiles or automobile bodies (not shown). The drawings, FIG. 1 to FIG. 7, are approximately to scale and the distances between the walls of the spray booth are about twenty (20) feet. The booth has vertical structural members 12, 14 and 16, and horizontal structural members 18 carried by the members 12 and 16, and inclined structural members 20 and 22 supported above the ground by the members 12, 14, and 16, and other conventional means. The members 12 and 16 are spaced about twenty (20) feet apart.

The booth encloses a spray painting chamber 24 which, optionally, may have a grill floor 26 and a conveyor 28 (partially shown) for conveying the articles, such as automobile bodies, to be painted. Below the grill floor 26 a flooded or water washed sheet or subfloor 30 is provided. If no grill floor is used, the subfloor 30 might, instead, be called a water washed floor. In this application a water washed or flooded subfloor is also referred ti as a water washed or flooded floor or vice versa. The subfloor has side weirs 32 and 34 which the waalls of the booth from subfloor or floor side troughs 36 abd 38, a crosss-trough 39 (like that shown in U.S. Pat. No. 4,726,287), and sheets 40 and 42 forming the inclined, water washed portion of the subfloor, the sheets being supported by the structural members 20 and 22. The sheets 40 and 42 have at their lower juxposed ends a pair of downwardly inclined extending flanges 44 and 46, terminating in up turned lips 48 and 50. The lips 48 and 50 therebetween form a gap or slot 52 of a first slot type washer. This slot washer is similar tro that shown in U.S. Pat. Nos. 4,328,012 or 4,521,227.

Below the slot 52 an inclined baffle 54 extends downwardly, terminating in an up turned lip 56. Beneath the subfloor two vertical walls 58 and 60 extend down to the ground. The wall 58 at its lower end has an airflow opening 62, while the wall 60 extends down to a bottom sump 64.

While the first washer means is formed at the slot 52, second, recirculating washer means 70 of the present invention is formed between the opening 62 and a third washer means 72 in the form of an air nozzle-water nozzle washer. The second washer means 70 comprises a curved, first recirculating or upper recirculating baffle 74 with a downstream lip 75, and a second recirculating or lower return baffle 76 with an up turned lip 78. Referring FIG. 2, to enhance the formation of a curtain of water at the lips 75 and 78 and encourage the formation of droplets, a sharp edged, saw tooth profile 79 (FIG. 2) is provided, and to help optimize conditions the saw tooth profiles 79 and libs 75 and/or 78 can be made adjustable. Likewise, the location and or length of the first and second recirculating baffles 74 and 76 and the curvature of the baffle 74 could be varied to optimize the desired cleaning action. In addition the curved baffle 74 may include a lower curved baffle 80. Of course, if desired, the curved baffles 74 and 80 could be formed by a single curved sheet.

As is shown, the third washer means 72 has an air nozzle 82 which contains a water nozzle 84, both being of the types described in U.S. Pat. Nos. 4,239,512 or 4,399,742. The air nozzle 82 is supported on an inclined sheet 86. Water for the water nozzle 84 is supplied by a pipe 88, which connects to the main water supply pipe 90 extending the length of the booth. An air lock is formed at the lower right end of the inclined sheet 90 and comprises a partition 96 and a air lock weir 98 in an air lock trough 99. The left side trough 36 for the subfloor is also supplied with water from the pipe 90, by the connecting pipes 92 and 94. The water for the right side trough 38 is supplied from the left side trough by the cross trough 39. Alternatively, a separate water supply could be provide for each of the side troughs, and the cross trough not used.

Water eliminator baffles 100 and 102 are provided in the chamber 104, and that chamber leads to the exhause duct 106. The booth, of course, would have conventional means, such as exhaust fans (not shown), connected to the exhaust duct 106 to withdraw the paint ladened air from the spray painting chamber 24, through the first slot washer 52, opening 62, second washer means 70, third washer means 72, and into the exhaust duct.

The operation of FIG. 1 embodiment is now described. Paint ladened air is withdrawn from the spray painting chamber 24, through the slot 52 wherin it mixes with the subfloor water flowing from the troughs 36 and 38 into the slot 52 defined by the lips 48 and 50. The water falls down to the baffle 54 and is thrown up by the lip to form a second water curtain through which the air must pass. The water from the subfloor then falls to the sump 64. The air and whatever few paint particles remaining therin are drawn through the opening 62 around the underside of baffle 76 into the second washer 70, and then into the air nozzle 82.

In the air nozzle 82 the air must pass through the sheets of water shot out of the water nozzle 84. This water is then drawn upward out the air nozzle to expand into the chamber 104, and the cleaned air is then exhausted out the duct 106.

This air can be treated and reused or at least partially reused, say 85% or more, by being sent back to the spray chamber 24.

The water in chamber 104 collects on that chamber's walls and the baffles 100 and 102 and falls down the iclined sheet 86 to collect in the air lock trough 99. The water in the air lock trough passes beneath the bottom of the partition 96, over the weir 98, and flows down the second recirculating or return baffle 76 to the tip 78.

There in the washer means 70, the water piles up to a pressure head of several inches on the baffle 76 at its upper end. Then the water at the upper end flows down to the lower end of baffle 76, and picks up velocity caused by gravity. The water then flows into the fast flowing air, off the lip 78 of the baffle 76, which can also be of the desired saw tooth profile into the air. As the water flows it forms a curtain of water 101 flowing upwardly toward and onto the underside of the first recirculating baffle 74. Some of the water may remain in the air and be pulled into the air nozzle 82 again, and to some extent reduce the amount of the water required from the water nozzle 84. Most and the remainder of the water due to its momentum and velocity is caused to travel on and along the underside of the baffle 74 and shoot off the saw tooth lip 75 of the baffle 74 to form yet another curtain of water 103 and, again, reach the baffle 76, wherein the water again flows by gravity down the top surface of the return baffle 76 back to the lip 78 to be recirculated again back to the baffle 74. This recirculation action continues to occur so that the water is, in a sense, trapped and forms these two water curtains as long as the air continues to flow witrh sufficient velocity. The water is able to flow up along baffle 76 and yet flow down the baffle 76 because, due to the turn in the air stream, the air's velocity is higher on the outside of the turn than the inside due to centrifugal force. Thus the greater air flow velocity along the underside of the baffle 74 moves the water upward, while the lesser air flow velocity over the upper side of the baffle 76 is unable to prevent the flow of water downwardly along the baffle 76. This downward flow (actually upstream with respect to the air flow) is due to the accumulated water on the baffle 76 and gravitational pull on the accumulation.

While it is not known exactly how many times the water may be recirculated in the recirculating washer between the two recirculation baffles 74 and 76, going along with the air flow and downstream with respect to the air flow on the underside of the baffle 74 due to the air flow and being returned upstream with respect to the air flow on the top side of baffle 76 by gravity. The water, from observations in an experimental test section is believed to recirculate many, many times. For example purposes, assume we traced the flow of 100 gallons of water into the recirculating washer and around baffles 74 and 76. On the first circuit around, the water flows up on baffle 74 and down on baffle 76 with two cleansing curtains 101 and 103 of water formed between these two baffles. Maybe some of the water is lost, say 5 gallons flows down the return sheet and into sump 64, but most, say 95 gallons, would again be recirculated another trip up on baffle 74 and down on baffle 76 to reform the cleansing curtains 103 and 101. Again another 5 gallons might be lost and the remainder, 90 gallons, again recirculated. Eventually after many circuits between and around on the two baffles 74 and 76 and through the curtains 101 and 103, all of the 100 gallons of water would have finally passed down the return sheet 110 into the sump 64. However, in the course of doing so the water would have many, many times helped form the two cleansing water curtains 101 and 103 between the baffles 74 and 76 to clean any paint particles from the air passing through the curtains. Of course additional make up water would have been admitted into the recirculating washer. As the water is used many times while it recirculates, the water curtains 101 and 103 are more full and require much less make up water than if the water but passed once around or over the baffles 74 and 76 and down into the sump.

It is believed that to operate satisfactory the air flow velocity must exceed 1.500 ft./minute and is, preferably, between 2,000 and 3,000 ft./minute. An air flow velocity lower than 1,000 ft./minute generally may not cause recirculation, and a velocity above 3,200 ft./minute may cause water carry over which is detrimental. The spacing or cross-sectional area between the recirculating baffles forming the recirculating washer, e.g., in FIG. 1, 74 and 76, is selected to achieve the desired air velocity. As is noted, most, if not nearly all, of the water flows along the baffles 74 and 76, and is transferred from one baffle to the other in the form of sheets or curtains, rather than merely a shower or spray into the air or space between the two baffles 74 and 76. Of course, when the amount of water being recirculated builds up, some of the water is not recaptured, but flows down the return sheet 110 into the sump 64. The return sheet 110 and underside of the baffle 76 also form a converging nozzle which tends to accelerate the air flow there through to increase its velocity so that it will impart a higher velocity to the water being carried from the baffle 76 to the baffle 74 and along the baffle 74.

Figure 3:
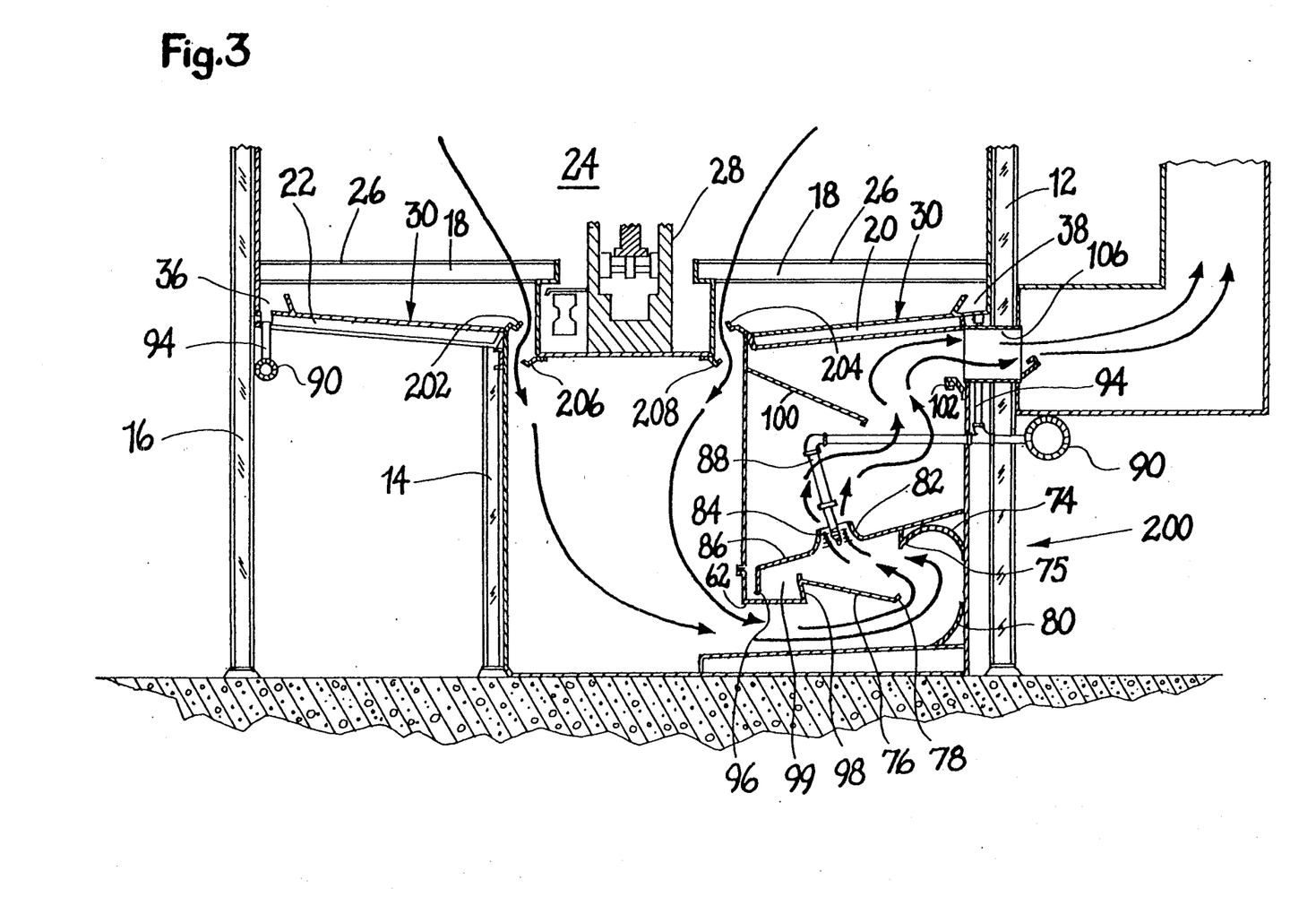
FIG. 3 is a cross-sectional view of a second embodiment recirculating washer of the present invention utilized in a dual slot downdraft type booth also having an air nozzle-water nozzle washer.

Referring to FIG. 3, a second embodiment 200 of the present invention is shown. The booth of FIG. 3 is essentially the same as shown in the copending U. S. patent application Ser. No. 07/528,106, entitled "Production Line Paint Spray Booth with Dual Slots", filed the same day as the parent of the present application in the names of the inventors Steve E. Telchuk and Leslie H. Brown and assigned to the same assignee as the present application. This booth has upper dual slots 202 and 204 and lower dueal slots 206 and 208. The recirculating washer 200 and the air nozzle-water nozzle washer are generally similar to that shown in FIG. 1. To the extent similar, the FIG. 3 embodiment will be given the same reference numerals as used in FIG. 1. However, as the conveyor in the FIG. 3 version extends into the subfloor, no cross-trough (39 in FIG. 1) is used and each side of the subfloor is supplied with water from its own supply pipes 90 and 94.

The operation of the second embodiment of FIG. 3 is generally the same as for that embodiment shown in FIG. 1.

Figure 4:
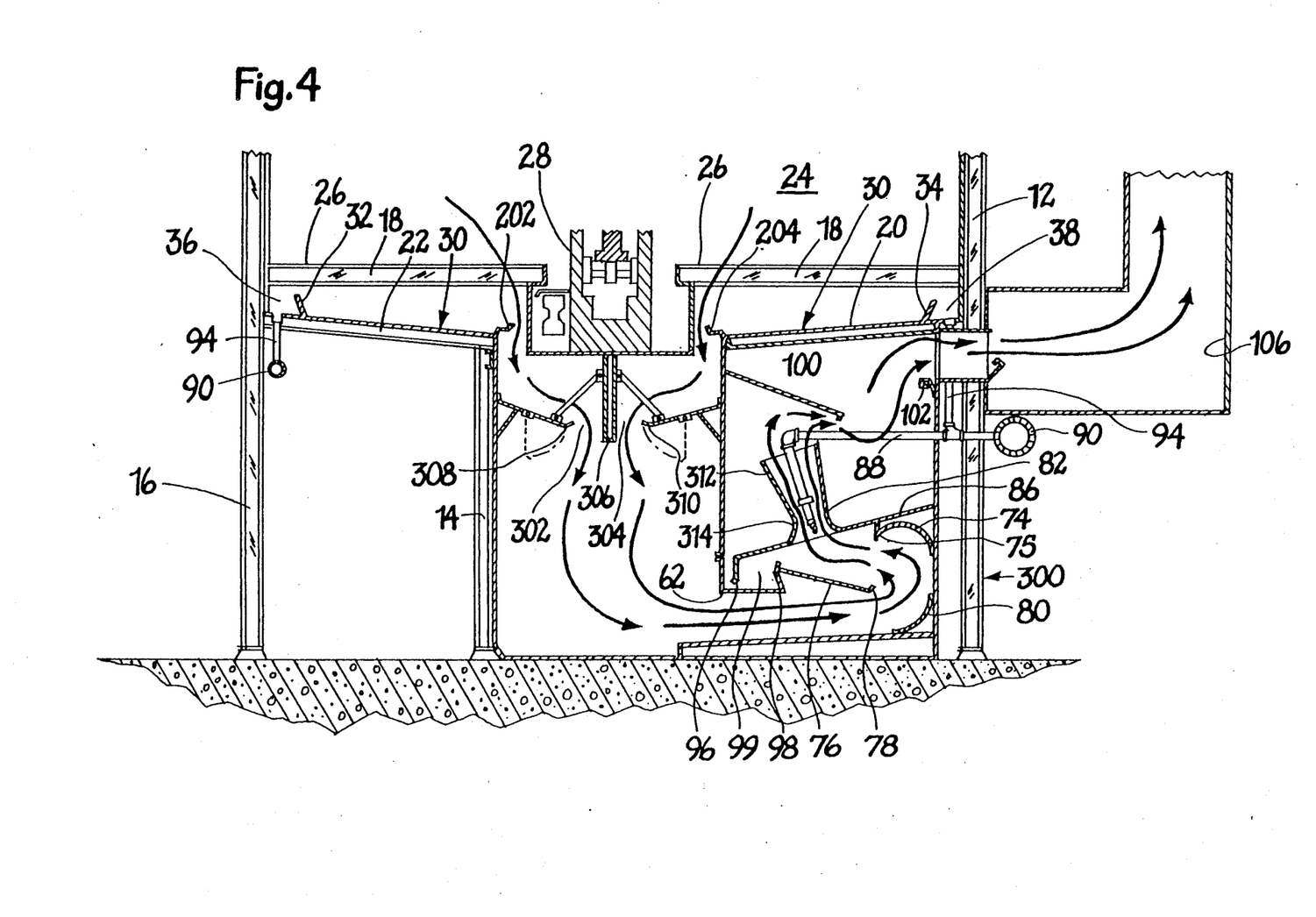
FIG. 4 is a cross-sectional view of a third embodiment of recirculating washer of the present invention utilized in a dual slot booth and having an air nozzle-water nozzle washer with a lengthened converging-diverging air nozzle.

Referring to FIG. 4, a third embodiment 300 of the present invention is shown. The booth of FIG. 4 is essentially the same as shown in said copending application. Again the recirculating washer 300 and the air nozzle-water nozzle are generally similar to the FIG. 3 embodiment, and to the extend similar are given the same reference numerals. The difference between the FIGS. 3 and 4 embodiments is that in FIG. 4, the lower set of dual slots 302 and 304 is formed between a center partition 306 and two hinged baffles 308 and 310.

The other principal difference is that the air nozzle 312 is considerably longer, in this instance about 2½ times the throat (minimum internal dimension) 314 of the nozzle, the nozzle having a converging-diverging construction. The longer air nozzle 312 is believed to provide additional cleaning action as the air and the water therein are held together for a longer period of time due to the much longer length, nearly three times longer than in the air nozzle shown in FIG. 3. Additionally, the converging-diverging construction will help recover the air velocity and convert it to static pressure to reduce the pressure loss in the nozzle.

While generally the prior art air nozzle-water nozzle washers have generally used 150 gallons each (based on a 14 inch diameter air nozzle) with four such nozzles on a ten foot booth section, with the present recirculating washer means 10, 100, 200 or 300 used in conjunction with the air nozzle-water nozzle washer will permit the water flow from the water nozzle to be reduced to 75 gallons per minute per nozzle, or less, thus greatly reducing the quantity of water required by a production, automotive size booth from 700 gallons per minute to 400 gallons per minute, or less, for a ten foot booth section. The recirculation washer of the present invention greatly increases the ability to use the prior art air nozzle-water nozzle washer in situation requiring low water flows.

Figure 5:
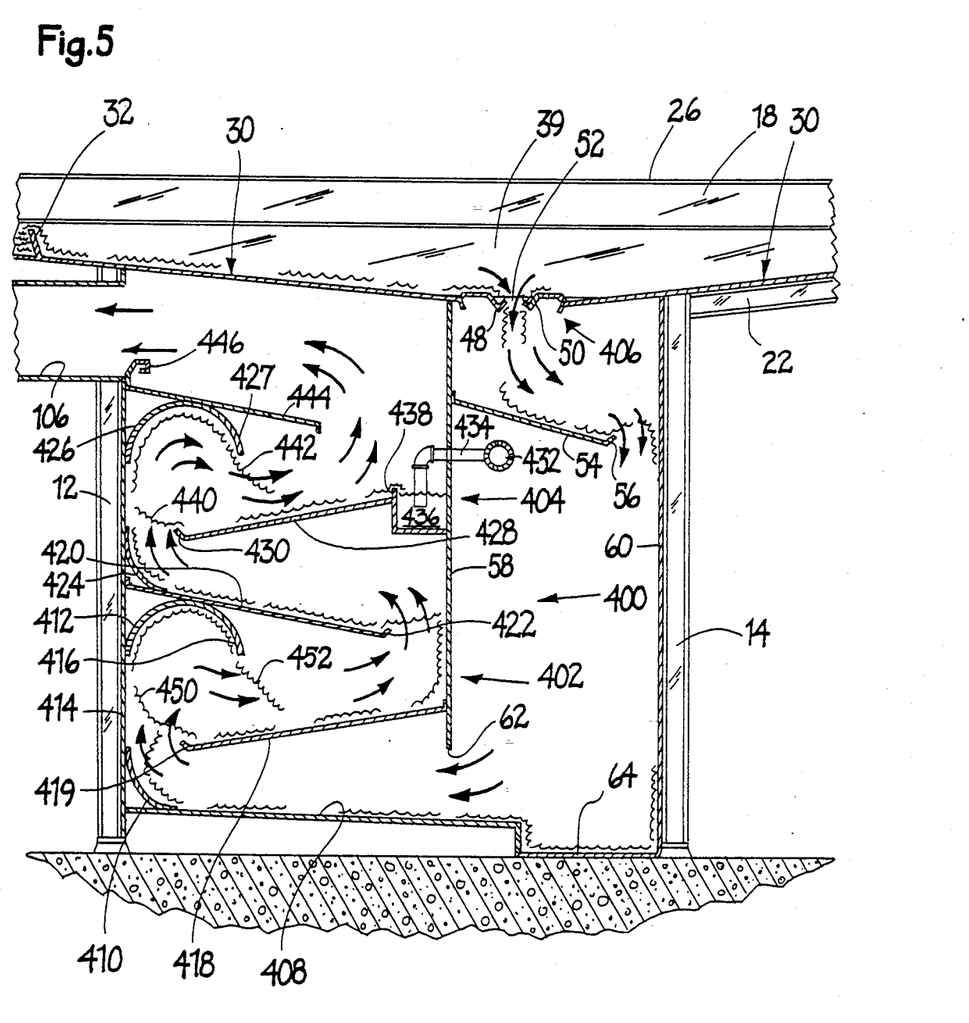
FIG. 5 is a cross-sectional view of a fourth embodiment of recirculating washer of the present invention showing a slot type booth with two recirculating washers sections in series.

Referring to FIG. 5, a fourth embodiment of recirculation washer 400 is shown and comprises two recirculation washers 402 and 404 arranged in series with each other and a preceding slot type washer 406 all beneath the paint spray booth.

In more detail, the embodiment shown in FIG. 5 is used in conjunction with a booth somewhat similar to the one shown in FIG. 1, and to that extent the same reference numerals will be used.

As the construction of the FIG. 5 embodiment is similar from the grill floor to the lower opening 62, it will not be described. The two recirculating washers 402 and 404 are located downstream of the opening 62. The recirculating washer 402 comprises a return sheet 408, a lower curved baffle portion 410 and an upper curved baffle portion 412 (both portions 410 and 412 forming the first recirculating baffle), in this instance carried by the wall 414. The baffle 412 has a downstream lip 416, which again can be of a saw tooth profile (similar to that shown in FIG. 2). A second, recirculating or return baffle 418 with a lip 419 is also provided. Again, preferably, the lip 419 is of a saw tooth profile. The recirculating washer 404 is similar to the washer 402 and has a return sheet 420 with a curved lip 422, a lower curved baffle 424 and an upper curved baffle 426 (portions 424 and 426 forming its first recirculating baffle), again carried by the wall 414. The curved baffle's 426 downstream end 427, again, can have a saw tooth profile. A recirculating return baffle 428 with a lip 430, which may also have a saw tooth profile, is provided.

Water may be provided from a supply pipe 432 and feed pipe 434 into a water supply trough 436 which has a weir side 438. As is shown the water overflows the weir side 438 flows down the return baffle 428 and is thrown off the saw tooth lip 430 into a curtain of water 440. The air flow, caused by the fan means (not shown) for the exhaust duct pulls the water back up over, onto and along the undersurface of the curved baffle 426 and is discharged off the saw tooth lip 427, into a water curtain 442, back onto the top side of the return baffle 428 to be again recirculated around the path just described. While much of this water recirculates, a little may be pulled toward the exhaust duct 106, and what water that does pass tends to collect on the water eliminator baffle 444 and 446 and/or adjacent walls and be returned to the baffle 428.

While little or no water passes out the top into the exhause 106, some water does pass from washer 404, down the return baffle 428 to the return sheet 420 and/or down the return baffle 420 into the recirculating washer 402. Again, some of this water is transferred off the return baffle 418 and is saw tooth lip 419 to form a curtain of water 450 flowing toward and onto the baffle 412. The water is then driven by its momentum and pulled by the air flow up the curved baffle 412 over its lip 416 into a curtain of water 452 flowing back to the return baffle 418 to again be recirculated. Again, some of the water may be pulled by the air flow back to the washer 404, but most recirculates in the recirculating washer 402 as described. Again, as the quantity of the water in washer 402 builds, some portion of the water will eventaully pass down the curved baffle 410, and down the sheet 408 into the sump 64.

Figures 6, 7:
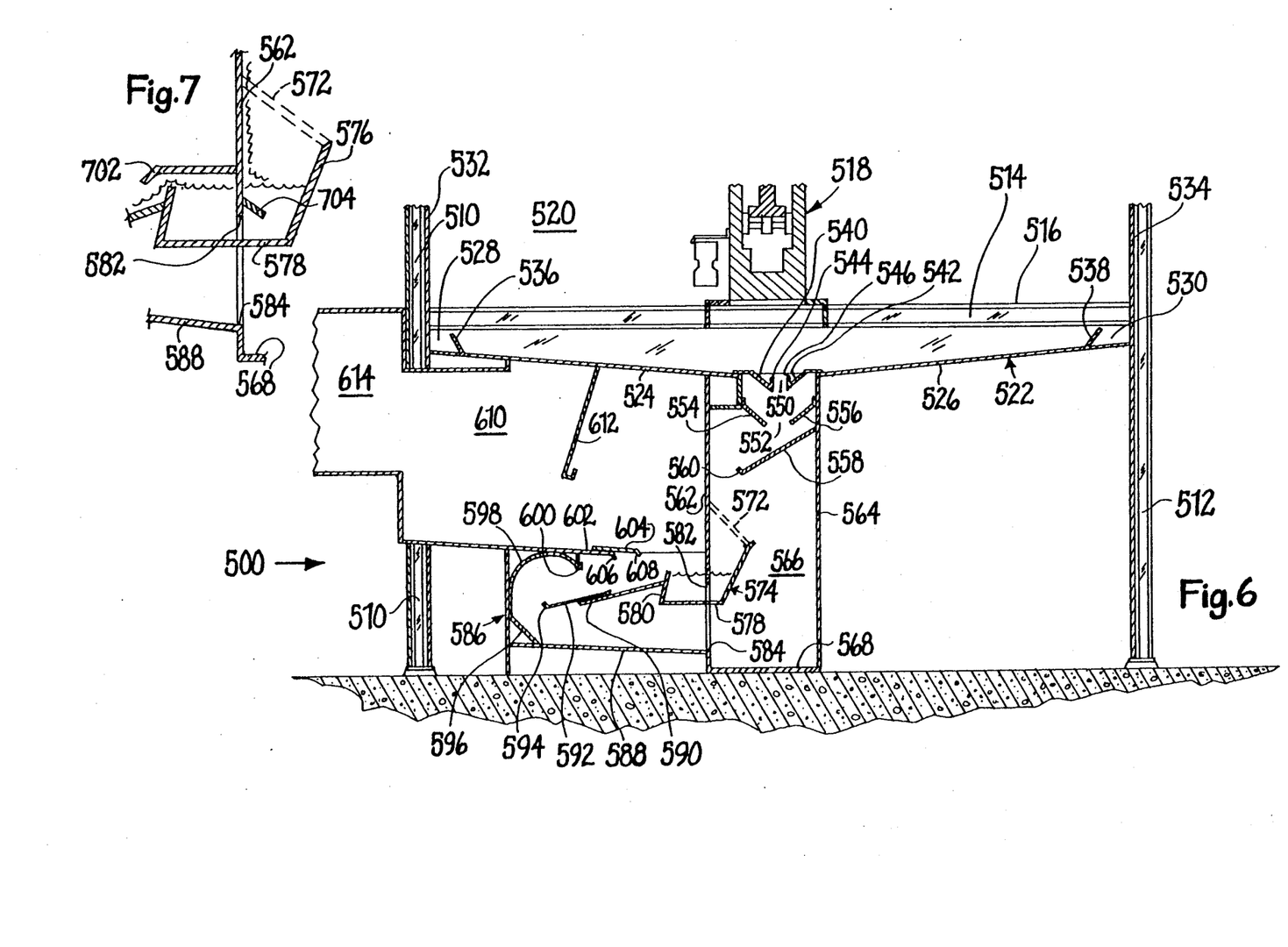
FIG. 6 is a fifth embodiment of recirlating washer of the present invention utilizing the floor water of the booth as its sole source of water for the recirculating washer.
FIG. 7 is an enlarged cross-sectional view of an alternative construction of a portion of the embodiment shown in FIG. 6.

Referring to FIG. 6, a fifth embodiment 500 of the present invention is shown and in some respects is similar to that shown in FIGS. 1 and 4. As can be seen the booth down to the first slot washer has a subfloor (or floor if the grill floor is omitted) like that shown in FIG. 1, and its subfloor is supplied with water from the booth's side troughs which are either each feed from a supply pipe or one is so feed and a cross trough (not shown, but like that of 39 in FIG. 1) supplies the other.

Embodiment 500 also has a single recirculating washer somewhat like the washer 70 of FIG. 1 or each of the washers 402 or 404 of FIG. 5. However, the embodiment 500 is greatly different in that, instead of supplying the recirculating washer with water from another washer or a supply pipe, the water used is the floor (or subfloor) water from the water washed sheet or floor. Thus, the amount of water required to operate this booth can be greatly decreased as the same water is used on the floor or subfloor, in all the booth's washer means and then recirculated many times in the recirculating washer. Whereas a prior art automotive size booth has utilized 700 gallons per minute per ten foot of booth length, a similar booth of embodiment 500 construction could utilize substantially less, say from 350 gallons per minute or less. Thus, on a per foot basis the booth of the present invention in the form shown in FIGS. 6 and/or 7 would have between 40 to 35 gallons per minute per foot of booth length water flow, and that may be as low as 30 gallons per minute per foot of booth length, all for a booth capable of accommodating full size automobile bodies on a production line basis.

In more particular, embodiment 500 has vertical supports 510 and 512 which at the floor of the booth are connected by horizontal beams 514. The beams 514 may, if desired, carry a grill floor 516, and, in this instance, a conveyor 518. Of course, the grill floor could be omitted in an automated booth (such as a arobotic or automatic paint spraying machine booth). Suitable booth structure, including a paint spraying chamber 520 is provided above the beams 518. Below the beams 518, which are spaced along the length of the booth, is provided a water washed subfloor 522. Of course, alternatively, an equivalent flooded floor (not shown) could have been provided and/or as previously noted if no grill floor were present, it would then be called the booth's floor, instead of subfloor. The water washed subfloor or floor 522 comprises a pair of downwardly extending sheets 524 and 526, one on each side of the booth. At each side of the subfloor 522 is a side trough, 528 or 520, formed between the booth's side wall 532 or 534 and a side trough weir 536 or 538. The inner ends of the two sheets 522 and 524 are spaced apart and carry steeper, downwardly inclined sheets 540 and 542, each terminating in an upwardly extending lip 544 or 546, the lips being spaced apart to form a first gap or slot 550. Below the first gap or slot is a second slot or gap 552 formed between two downwardly inclined baffles 554 and 556, and below the second slot or gap is a longer, downwardly inclined baffle 558, having an upwardly extending tip 560, which extends from one side to beyond the second slot or gap 552. The structure just described is somewhat similar to that shown in U.S. Pat. No. 4,524,227.

The baffles 554 and 556 are partially or fully supported from two vertical walls 562 and 564 which, in turn, are spaced apart to form an enlarged volume 566, and at the buttoms of which is formed a sump 568. The wall 564 also carries the longer inclined baffle 558. To give adequate velocity to the water in the upper slots 550 and 552 and off the baffle 560, the vertical height from the lowest point of the subfloor to the sump is on the order of seven feet. Of course any greater distance could be used.

Between the tip 560 of the longer baffle 558 and wall 562, another gap or slot 570 is formed, and below the gap 570 a deflector grill or screen 572 (represented by the double dotted lines) is provided. The deflector screen 572 may be, say a ½ inch × ½ inch mesh or sets of baffle plates, such as shown in U.S. Pat No. 3,932,151, which would let water pass therethrough but would deflect off large particles of agglomerated paint which may have collected on and then been knocked off the grill floor, the deflected particles falling down, over the screen or baffles, and to the right into the sump 568, while the water passes generally straight down into the water collection trough 574 below.

The collection trough 574 is also at least partially suppported by the wall 562 and has an imperforated extended side 576, a bottom 578 and a side weir 580. An opening 582 is provided through the wall 562 to permit water, but not air, to pass therethrough, this opening being located several inches below the water line in the collection trough so that water collected in the trough can pass over the weir 580.

Another much larger air flow opening 584 is provided in the wall 562, beneath the collection trough 574 for the now partially cleaned, paint laden air to pass (this opening being similar to opening 62 of FIG. 1).

A recirculating washer 586, which receives the partially cleaned paint ladened air from opening 584 and wash water from the weir 580, is provided. This washer 586, like the previously described recirculating washers, has a lower inclined return sheet 588, which can discharge liquid into the sump 568 and a lower or recirculating return baffle 590 spaced above the return sheet, the downstream (with respect to air flow) end of the return sheet being closer to the return baffle than is the upstream end of the return sheet to the return baffle so that as the air moves away from the opening 584, it is accelerated in velocity. Of course, the downstream end of the return baffle, like the downstream end of the return sheet, is pitched above its respective upstream end so that liquid flowing there along will move opposite the direction of air flow.

The downstream end of the return baffle 590 is connected to the weir side 580, while the upstream lip of the return baffle carries an adjustable end 592 having, preferably a saw tooth tip 594 which may be adjustably slid into various positions and locked or held in place by conventional means to optimize recirculating action. The recirculating washer 586 also includes a curved upper or recirculating baffle, which in the instance has a lower portion 596 and the upper curved portion 598, terminating, perferably in a saw tooth profile tip 600. To prevent the water leaving the tip 600 being prematurely drawn upwards, a baffle 602 with an adjustable end 604, with bent back tips 606 and 608, are provided. To reach the desired air flow velocity the minimum space between the tip 600 and the return baffle 590 is about one foot.

Above the baffles 602 and 604, a water elimination chamber 610 is formed between the wall 562, the sheet 524 forming one side of the water washed subfloor, and other walls. The chamber 610 may be provided with a water eliminator baffle 612 and is connected to an exhaust duct 614, the exhaust duct 614 being exhausted by conventional exhaust fans (not shown).

The operation of embodiment 500 will now be described. Paint ladened air formed in the paint spray booth 520 during a painting operation is drawn down by the exhaust fans through the first and second gaps 550 and 552. Water supplied to the side troughs 528 and 530 overflows the weir walls 536 and 538 and flows in solid sheets down the floor 524 and 526 and over baffles 540 and 542, is thrown upward by the lips 544 and 546 to mix and clean the paint ladened air. As the paint ladened air flows down through the second gap 552 more mixing and cleaning takes place. The water then falls down to the baffle 558, runs down the same, and is thrown up by the lip 560 to again mix with and clean the descending paint ladened air. The water now generally flows down the wall 562 and passes through the water screen or deflector 572 to collect in the trough 574, with the air and with what little paint particles there remains entrained therein bypass around the trough 574 and into the opening 584. Should any large agglomerated particles of paint, such as those that collect on the grill floor, fall off and be washed down into the first or second slots 550 and 552, they are deflected off into the sump 568 by the deflector 572. Thus, the trough 574 will not clog with such large paint particles.

The air is then pulled by the exhaust fans through the space between the return sheet 588 and return baffle 590, around the return baffle's 590 tip 592 into the eliminator chamber 610 and out the exhaust duct 614. However, while so moving the air undergoes further cleaning action in the recirculating washer 586.

With water trough 574 filled, excess water overflows the weir 580 and flows down over the recirculating return baffle 590 and its adjustable saw tooth edged tip 592. The saw tooth tip helps break up the water flow so that it will be more easily transported upward by the air flow. As noted the water flows off the tip 592 and is carried upward to the other recirculating baffle portion 598. Of course, as the air passes through the resulting curtain of water between the tip 594 and the curved recirculating baffle 598, the air is again cleaned. The water moves along the surface of curved recirculating baffle 598, and then flows off its saw tooth tip 600, and is thrown across the space in another cleaning curtain of water back to the downstream and (with respect to the air flow) of the recirculating return baffle 590, where it again flows down that baffle to again be recirculated. If any water passes up toward the chamber 610, it is collected on the walls of that chamber and/or baffle 612 and drains back down into the trough 574 and/or return baffle 590 so that only essentially water free, paint particle free air is exhausted out the stack or exhaust duct 614.

When sufficient quantity of water is accumulated on the lower recirculating baffle 590, in an amount more than the air flow can carry upward to the upper recirculating baffle, the excess water will flow by gravity down onto the return sheet 588 and into the sump 568.

Referring to FIG. 7, an alternative showing additional structure for the trough 574 is illustrated. All parts similar to those of FIG. 6 are given the same reference numbers. The alternative construction shown in FIG. 7 may be more preferable. As shown in FIG. 7 the trough 574 is provided with a cover 702 which nearby closes the top of the trough to prevent air flow over the top of the trough from picking up water from the top of the trough and carrying it into the water eliminatior section. Additionally, a submerged or underwater baffle 702 can be provided to first deflect the downwardly flowing water coming through the screen 572 into the right side of the trough before it passes through the opening 582 to help dissipate the water's energy and reduce the tendency for it to force excess water down the lower, return baffle 590.

Figure 8:
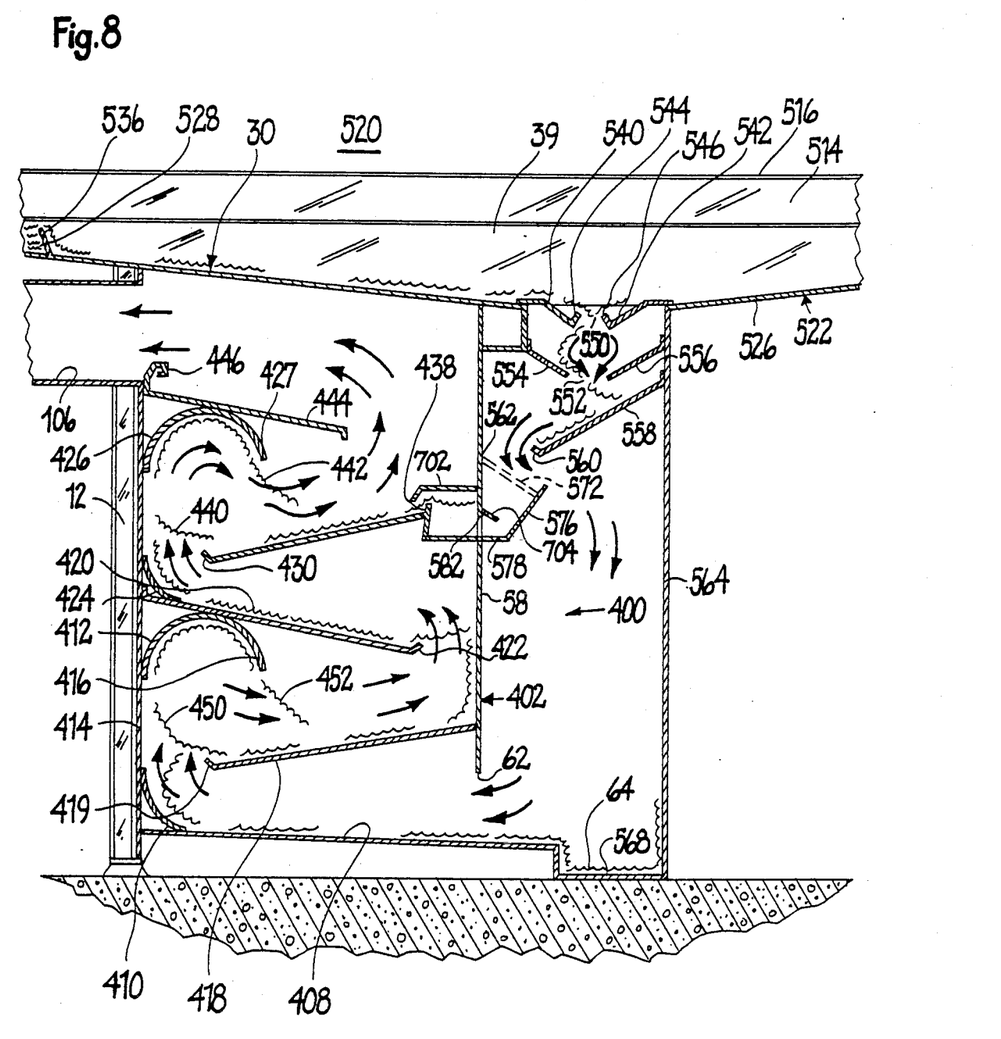
FIG. 8 is a sixth embodiment of recirculating washer of the present invention which is a synthesis of the embodiments shown in FIGS. 5,6 and 7.

Referring to FIG. 8 a sixth embodiment of recirculating washer is shown. The portions of this embodiment from just below the spray painting chamber to the entrance to the recirculating washer section are generally similar to that shown in FIG. 6, have the trough cover of FIG. 7, and are given the same reference numerals as in FIGS. 6 and 7. FIG. 8, from the recirculating washer section through the exhaust duct in this sixth embodiment, is similar to the double recirculating washers shown in FIG. 5 and is given the same reference numerals in FIG. 5. The operation of the sixth embodiment is similar to that for the embodiments of FIGS. 5 and 6, with the floor water from the booth being supplied to the double recirculating washers.

Figure 9:
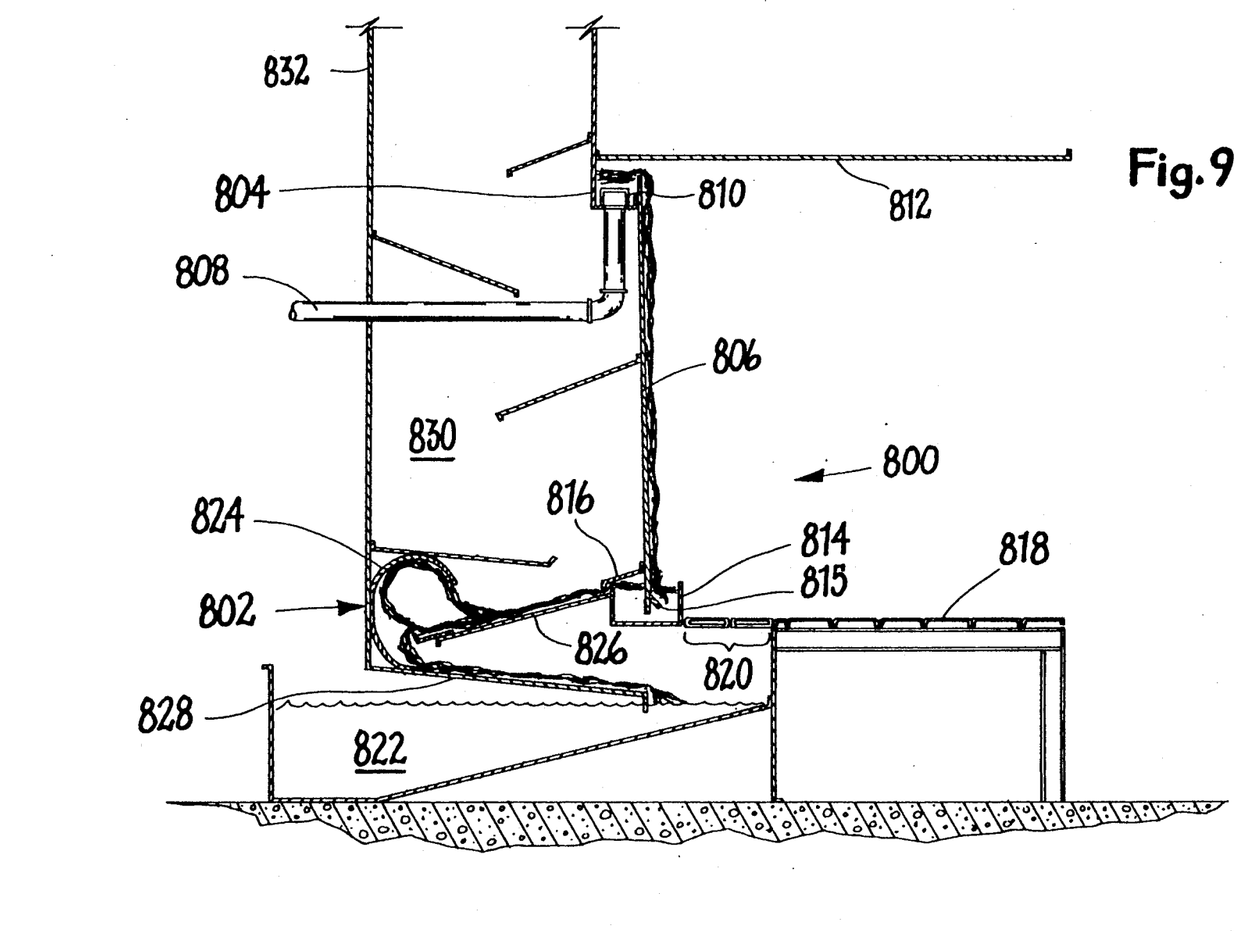
FIG. 9 is a seventh embodiment of recirculating washer of the present invention used in a water washed wall, cross draft booth.

Referring to FIG. 9, a seventh embodiment 800 is shown having the recirculating washer of the present invention 802 incorporated into a water washed sheet or wall, cross draft type booth. In this type booth the articles to be painted are placed in the upstream spray painting chamber and in front of the water washed wall and then spray painted. This water washed wall is in fact a first washer, paint spray impinging on the water washed wall becoming entrained in the water flowing down the wall. If desired the articles to be painted could be moved by a conveyor (not shown). Generally such a booth has an upper water trough 804 which supplies water to flow down a water washed wall 806, the upper trough being supplied with water from a pipe 808. To present undue turbulence in the trough 804, a baffle 810 could be provided over the pipe outlet. To contain overspray and control air flow, the booth may have a roof 812. The water washed wall 806 at its lower end terminates in a collection trough 814, which is generally similar to the trough shown in FIG. 7, having a baffle 815 and a partial cover 816. The booth has a work floor 818, a portion 820 of which is adjacent the collection trough is permeable to air flow, in this instance the two left most plants of the floor being fenestrated to form an open grill.

Extending beneath the floor portion 820 is a water tank 822 which both acts as a final collector of water from the booth, which water may be subsequently treated and resupplied to the pipe 808, and to catch any overspray falling onto the right hand end of the tank from the spraying operation.

The recirculating washer 802 is similar to those previously described and generally operates in the same manner, having a first recirculating baffle 824, a return baffle 826 and a return sheet 828. The collection trough 814 supplies, in this instance from its left hand top side, water to the return baffle 826, wherein it is recirculated on the first recirculating and return baffles 824 and 826, and eventually generally runs down the return sheet 828 into the tank 822.

The air flow through this booth is down from the spray area juxposed the water washed wall 806 carrying the entrained paint overspray, through the fenestrated floor portion 820, between the return sheet 828 and underside of the return recirculation baffle 826, between the first recirculation baffle 824 and baffle 826, into the water elimination section 830, and finally into the downstream exhaust duct 832.

If desired, the tank 822 could be of a different shape and of a shallower depth. While not shown, if need be, one or more additional recirculating washer sections could be provided in a manner somewhat similar to that shown in FIG. 8.

The recirculation in the washers shown in FIG. 3, 4, 5, 6, 7, 8 and 9 is similar to that described for the recirculating washer shown in FIG. 1.

The recirculation action in the recirculating washers of the type described in FIGS. 1, 3, 4, 5, 6, 7, 8 and 9 is so strong that even if the addition of new water is stopped, the water in the recirculating washer itself recirculates many times as described for several minutes before the water finally drains out of the recirculating washer, the recirculation being powered simply by air flow upstream and gravity downstream.

While the recirculating washer is shoen both with slot and/or an air nozzle-water nozzle washer or with another recirculating washer, it could also be ujsed with other type washers and/or retrofitted to any prior art booths, such as down draft, cross draft, etc., which do not meet present cleaning efficiency standards and update them to do so.

The only limiting factor as to the amount of recirculation which can be usded is that the collection of paint overspray may contaminate the recirculated water to the point that some of the recirculated water should be withdrawn and cleaner makeup water should be added.

While the term water is used herein, it should be understood it encompasses and includes any washing liquids used in paint spray booths, such as water with additives and/or oils or oil based liquids, instead.

While several preferred embodiments of the method and apparatus of the present invention have been illustrated and described herein, it will be understood that variations, modifications and equivalent structures and steps thereof fall within the scope of the appended claims.

What is claimed is:

1. Recirculating washer means for use in a paint spray booth having a spray painting chamber for spraying point and an exhaust duct downstream of said spray painting chamber, comprising air stream means for moving paint ladened air in an air stream from the upstream spray painting chamber into the downstream exhaust duct, a source of water, first recirculating baffle means and recirculating return baffle means for recirculating water more than once from said first recirculating baffle means to said recirculating return baffle means and from said recirculating return baffle means to said first recirculating baffle means, said first recirculating baffle means being juxposed above and said recirculating return baffle means being juxposed below said air stream means, said source of water supplying water to at least one of said first recirculating baffle means and recirculating return baffle means, said first recirculating baffle means having an upstream portion and a downstream portion and being located adjacent and above said recirculating return baffle means, said recirculating return baffle means being inclined and having a lower upstream portion and a higher downstream portion, said recirculating return baffle means flowing water from its higher downstream portion to its lower upstream portion by gravity, said recirculating return baffle means discharging water from its upstream portion into said air stream means, said air stream means carrying the water discharged from said upstream portion of said recirculating return baffle means upwards onto said first recirculating baffle means, said first recirculating baffle means and recirculating return baffle means forming at least one curtain of water therebetween in said air stream means for cleaning paint ladened air in said air stream means flowing from the upstream spray painting chamber to the exhaust duct, whereby the water can be recirculated more than once around said first recirculating baffle means and recirculating return baffle means forming more than once said at least one curtain of water for cleaning paint ladened air in said air stream means from the spray painting chamber, the recirculating water being moved downstream on said first recirculating baffle means by said air stream means and upstream and downwardly on said recirculating return baffle means by gravity.

2. Washer means as in claim 1, wherein each of said first recirculating baffle means and recirculating return baffle means forms a second curtain of water with the other of said first recirculating baffle means and recirculating return baffle means, and each of said curtains of water being adapted to clean said air stream means moving downstream from the spray painting chamber, whereby said air stream means is cleaned at least twice.

3. Washer means as in claim 1, wherein said first recirculating baffle means is generally curved with its downstream portion above its upstream portion.

4. Washer means as in claim 1, wherein said source of water is above said first recirculating and recirculating return baffle means.

5. Washer means as in claim 1, wherein said first recirculating baffle means and said recirculating return baffle means are spaced apart a distance to cause said air stream means therebetween to move at a velocity in excess of 1,000 feet per minute.

6. Washer means as in claim 1, further comprising an inclined sheet below said recirculating return baffle means, said inclined sheet having its downstream portion above its upstream portion and leading into said first recirculating baffle means.

7. Washer means as in claim 6, wherein said upstream portion of said inclined sheet is spaced away from the underside of said downstream portion of said recirculating return baffle means a greater distance than the downstream portion of said inclined sheet is spaced away from the underside of said upstream portion of said recirculating return baffle means to cause the velocity of the said air stream means to increase as it moves downstream between the underside of said recirculating return baffle means and said inclined sheet.

8. Washer means as in claim 1, wherein said inclined sheet, said recirculating baffle means and said first recirculating baffle means cause the air stream means to change at least 90° in direction.

9. Washer means as in claim 8, wherein said direction change is over 150°.

10. Washer means as in claim 1, further comprising additional washer means located one of upstream and downstream of said recirculating washer means.

11. Washer means as in claim 10, wherein said additional washer means comprises a slot type washer.

12. Washer means as in claim 11, wherein said slot type washer is located upstream of said recirculating washer means.

13. Washer means as in claim 10, wherein said additional washer means comprises an air nozzle-water nozzle type washer.

14. Washer means as in claim 13, wherein said air nozzle-water nozzle type washer is located downstream of said recirculating washer means.

15. Washer means as in claim 14, wherein said source of water is said air nozzle-water nozzle washer and said first recirculating and recirculating return baffle means are supplied with water from said air nozzle-water nozzle washer.

16. Washer means as in claim 14, wherein said recirculating washer means is adapted to discharge some of its water into said air nozzle.

17. Washer means as in claim 10, further comprising a second additonal washer means located one of upstream and downstream of said recirculating washer means.

18. Washer means as in claim 1, wherein said source of water comprises a water washed sheet of said paint spray booth.

19. Washer means as in claim 18, wherein said water washed sheet is a floor flooded with water.

20. Washer means as in claim 18, wherein said water washed sheet is a wall flooded with water.

21. Washer means as in claim 1, wherein said source of water is a trough.

22. Washer means as in claim 21, wherein said source of water further comprises a water supply pipe supplying water to said trough.

23. Washer means as in claim 22, wherein said paint spray booth further comprising a water washed floor and wherein said trough is located below said water washed floor.

24. Washer means as in claim 21, wherein said paint spray booth further comprises a water washed floor and wherein said trough is located to the side and above said water washed floor, said trough supplying water to said water washed floor.

25. Washer means as in claim 24, further comprising a collection trough, said collection trough being located below said water washed floor, receiving water from said water washed floor, and supplying water to said first recirculating and recirculating return baffle means.

26. Washer means as in claim 25, wherein said collection trough has an air lock partition therein permitting water to pass therethrough but preventing air flow from passing therethrough.

27. Washer means as in claim 25, wherein said collecting trough feeds water onto said recirculating return baffle means.

28. Washer means as in claim 1, further comprising a saw tooth profile on at least one of said first recirculating and recirculating return baffle means.

29. Washer means as in claim 28, further comprising a saw tooth profile on both of said first recirculating and recirculating return baffle means.

30. Washer means as in claim 25, further comprising a cover for closing a portion of the top of said collection trough to prevent water from being drawn out of said collection trough by said air stream means.

31. Washer means as in claim 25, further comprising an underwater baffle located in said collection trough to dissipate the energy of the water flowing into said collection trough.

32. Washer means as in claim 1, wherein said booth is sized to paint an autombile and said source of water supplies about 40 or less gallons per minute per foot of booth length.

33. Washer means as in claim 1, wherein said air stream means moves between said first recirculating and recirculating return baffle means at a velocity greater than 1,000 feet per minute but not greater than 3,200 feet per minute.

34. Washer means as in claim 33, wherein said air stream means moves between said first recirculating and recirculating return baffle means at a velocity in excess of 1,500 feet per minute and not greater than 3,000 feet per minute.

35. Washer means as in claim 33, wherein said air stream means moves between said first recirculating and recirculating return baffle means at a velocity between 2,000 to 3,000 feet per minute.

36. Washer means as in claim 1, wherein said first recirculating and recirculating return baffle means are spaced apart to cause said air stream means between said first recirculating and recirculating return baffle means to move at a velocity of between 1,000 and 3,200 feet per minute.

37. Washer means as in claim 1, wherein said first recirculating and recirculating return baffle means are spaced apart to cause said air stream means between said first recirculating and recirculating return baffle means to move at a velocity between 2,000 and 3,000 feet per minute.

38. A paint spray booth comprises a spray painting chamber for painting automotive vehicles, a water washed floor beneath said spray painting chamber, a source of water for said water washed floor, a first slot washer formed at the bottom of said water washed floor, water from said source flowing over said water washed floor into said first slot, a recirculating washer downstream from said first slot, said recirculating washer receiving water from said first slot, said source of water supplying water to said booth at a rate of 75 or less gallons per minute per foot of booth length.

39. A booth as in claim 38, wherein said recirculating washer comprises a first baffle and a return baffle, one of said first and return baffles receiving water from said first slot and providing water to the other of said first and return baffles, said other baffle receiving water from said one baffle and returning water to said one baffle, said first and return baffles being adapted to form one or more curtains of water therebetween for cleaning the air from said spray painting chamber while recirculating the water on and around said first and return baffles.

40. A booth as in claim 39, further comprising a collection trough located beneath said first slot, adjacent said return baffle and collecting water from said first slot, said collection trough providing water to said recirculating washer.

41. A booth as in claim 40, further comprising a deflection screen adjacent said collection trough for passing water therethrough but being adapted to deflect large particles from said collecting trough.

42. A booth as in claim 39, wherein one or more of said first and return baffles have saw tooth profiles on their edges discharging a curtain of water.

43. A booth as in claim 42, wherein both said first and return baffles have saw tooth profiles on the edges of said baffles discharging a curtain of water onto the other of said baffles.

44. A method of operating a recirculating washer for a paint spray booth to clean paint ladened air, the booth having air flow moving from an upstream spray painting chamber to a downstream exhaust duct, a first recirculating baffle and an inclined recirculating return baffle spaced below the first recirculating baffle, comprising the steps of:
(a) flowing paint ladened air through the washer and between the first recirculating baffle and the recirculating return baffle,
(b) discharging water off the recirculating return baffle on to the first recirculating baffle,
(c) moving the water downstream with air flow on the first recirculating baffle above the recirculating return baffle,
(d) flowing the water off the first recirculating baffle and downwardly by gravity onto the recirculating return baffle,
(e) flowing the water downward on the recirculating return baffle back to the locus the water was discharged from in step (b),
(f) passing the paint ladened air flow through the discharged water to cleanse the air, and
substantially repeating the steps (a) through (f) as long as the air flows.

45. The method of claim 44, comprising the further step of creating a second curtain of water during step (d) between the first recirculating baffle and the recirculating return baffle, and passing the paint ladened air through the second curtain of water to cleanse the air a second time for each recirculation.

46. The method of claim 44, wherein said paint spray booth further comprises another washer means, and comprising the step of supplying the water to said recirculating washer from said other washer means.

47. The method of claim 44, wherein said paint spray booth further comprises a wate washed sheet, and comprising the step of supplying the water to said recirculating washer from said water washed sheet.

48. The method of claim 47, comprising the step of deflecting any large particle from the water washed sheet away from the recirculating washer.

49. The method of claim 44, wherein a second recirculating washer is provided, comprising the subsequent step of discharging some of the water from the recirculating washer to the second recirculating washer which also carry out steps (a) through (f).

50. The methd of claim 44, comprising the step of flowing the air between the first recirculating baffle and recirculating return baffle at a velocity greater than 1,000 feet per minute but less than 3,200 feet per minute.

51. The method of claim 44, comprising the step of flowing the air between the first recirculating baffle and recirculating return baffle at a velocity between 2,000 and 3,000 feet per minute.

52. The method of claim 44, further comprising the step of supplying about 75 gallons or less of water per minute per foot of length of the spray paint booth.

53. The method of claim 44, wherein the booth is sized to paint automobile bodies and comprising the step of supplying the booth with about 40 gallons of water or less per minute per foot of length of the booth.

54. The method of claim 53, wherein said booth has a water washed floor, comprising the step of flowing said 40 gallon of water or less onto said water washed floor and into said recirculating washer.

55. Washer means as in claim 13, said air nozzle being elongated and having an inlet, a throat and an outlet, said throat being smaller than said inlet and outlet, whereby the conveging, diverging construction of said air nozzle minimizes the pressure drop through said nozzle.

56. A washer as in claim 55, wherein said air nozzle is of a length about least two and one half times greater than the throat of said air nozzle.

57. Washer means as in claim 10, wherein said additional washer means comprises a water washed wall extending above said first recirculating and recirculating return baffle means, said water washed wall supplying water to said first recirculating and recirculating return baffle means.

58. Washer means as in claim 1, wherein said source of water comprises a water washed wall of the paint spray booth.

59. Washer means as in claim 58, wherein said paint spray booth includes a floor and said water washed wall extends above said floor and discharge water below said floor.

60. Washer means as in claim 1, wherein said paint spray booth further comprises a water washed wall and wherein said source of water is a trough, said trough being located and above said water washed wall, said trough supplying water to said water washed wall.

61. Washer means as in claim 60, further comprising a collection trough, said collection trough being located below said water washed wall, receiving water from said water washed wall, and supplying water to said first recirculating and recirculating return baffle means.

62. Washer means as in claim 61, wherein said collection trough has an air lock partition therein permitting water to pass therethrough but preventing air flow from passing therethrough.

63. Washer means as in claim 62, wherein said collecting trough feeds water onto said recirculating return baffle means.

64. Washer means as in claim 61, further comprising a cover for closing a portion of the top of said collection trough to prevent water from being drawn out of said collection trough by said air stream means.

65. Washer means as in claim 61, further comprising an underwater baffle located in said collection trough to dissipate the energy of the water flowing down said water washed wall into said collection trough.

66. Washer means as in claim 58, whereing said source of water supplies about 40 or less gallons per minute per foot of booth length.

* * * * *